United States Patent [19]
Abrams et al.

[11] Patent Number: 5,133,470
[45] Date of Patent: Jul. 28, 1992

[54] TAMPER-PROOF CONTAINER AND CAP ASSEMBLY

[75] Inventors: Robert S. Abrams, Albany; H. Carl Smith, Fultonville, both of N.Y.

[73] Assignee: Capitol Vial, Inc., Fultonville, N.Y.

[21] Appl. No.: 533,455

[22] Filed: Jun. 5, 1990

Related U.S. Application Data

[63] Continuation-in-part of Ser. No. 464,417, Jan. 12, 1990, Pat. No. 5,012,941.

[51] Int. Cl.⁵ .............................................. B65D 55/06
[52] U.S. Cl. .................................. 215/250; 215/237; 220/265
[58] Field of Search .............. 215/250, 235, 237, 238, 215/245; 220/265, 266, 268, 315, 324, 339, 354

[56] References Cited

U.S. PATENT DOCUMENTS

| | | |
|---|---|---|
| 218,719 | 1/1879 | Doyle . |
| 741,307 | 10/1903 | Chapman ............................ 215/250 |
| 1,690,853 | 11/1928 | Behrman . |
| 2,772,014 | 11/1956 | Clark . |
| 3,063,549 | 11/1962 | Weichselbaum ................ 220/339 X |
| 3,265,426 | 8/1966 | Brooks et al. . |
| 3,416,688 | 12/1968 | Fanning . |
| 3,510,021 | 5/1970 | Silver . |
| 3,556,575 | 1/1971 | Farkas . |
| 3,994,519 | 11/1976 | Williams . |
| 4,271,972 | 6/1981 | Thor . |
| 4,276,988 | 7/1981 | Kimm et al. . |
| 4,339,056 | 7/1982 | Berkstresser, Jr. et al. . |
| 4,420,089 | 12/1983 | Walker et al. ....................... 215/216 |
| 4,442,946 | 4/1984 | MacDonald et al. ............... 215/230 |
| 4,537,432 | 8/1985 | Meeks . |
| 4,658,955 | 4/1987 | Eichner . |
| 4,782,977 | 11/1988 | Watanabe et al. .................. 220/324 |
| 4,811,865 | 3/1989 | Mueller, Jr. et al. . |
| 4,812,116 | 3/1989 | Abrams . |
| 4,896,780 | 1/1990 | Jessop et al. . |
| 4,934,547 | 6/1990 | Mayes et al. ....................... 215/306 |
| 4,938,360 | 7/1990 | Wallace ............................... 206/586 |
| 4,974,735 | 12/1990 | Newell et al. ...................... 215/253 |

FOREIGN PATENT DOCUMENTS 515115 11/1952 Belgium .

Primary Examiner—Stephen Marcus
Assistant Examiner—Stephen Cronin
Attorney, Agent, or Firm—Burns, Doane, Swecker & Mathis

[57] ABSTRACT

A tamper-proof plastic vial is rendered tamper-proof during transport to and from a specimen-receiving site. The vial comprises a container and cap molded together in one piece. The cap is inserted onto the container during the manufacturing phase and is secured thereto by a first destructible connector in the form of an arrow-like projection so that the integrity of the container is ensured until a specimen is received. Thereafter, a second destructible member in the form of a flexible one-way strip is attached to form a second destructible connection. The container carries an outer channel which receives a peripheral edge of the cap to establish a tortuous bacterial path and to resist accidental opening of the cap. The first destructible connection is created in response to a controlled shrinkage of the assembly during the cooling phase of manufacturing.

14 Claims, 4 Drawing Sheets

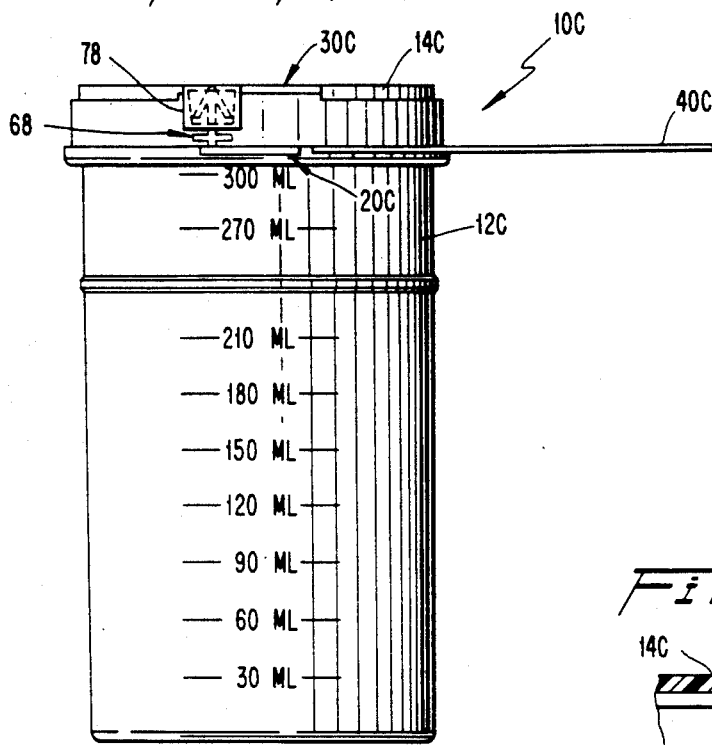
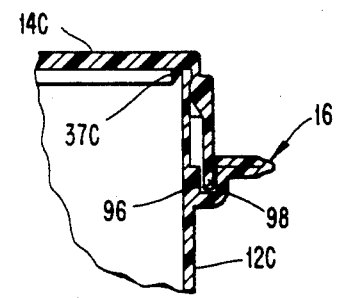
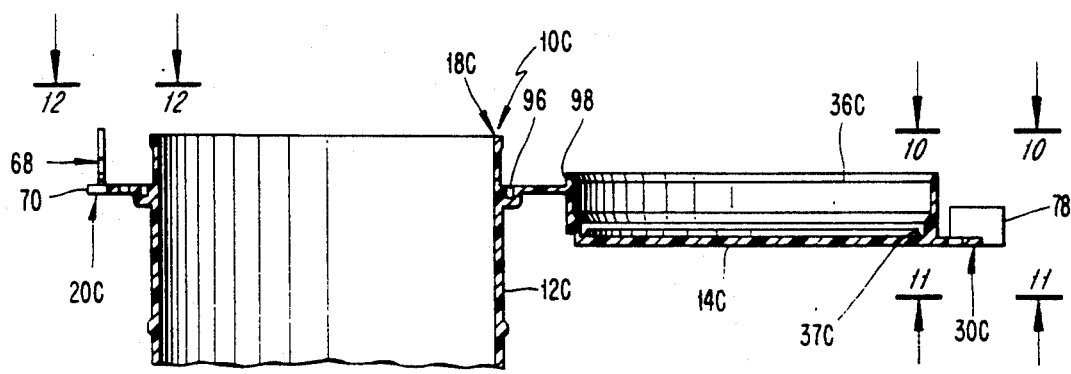

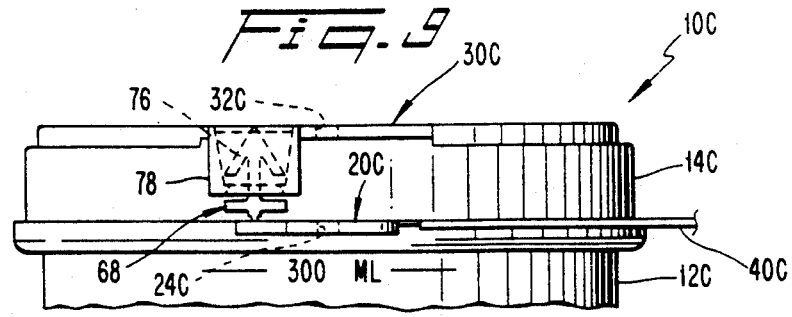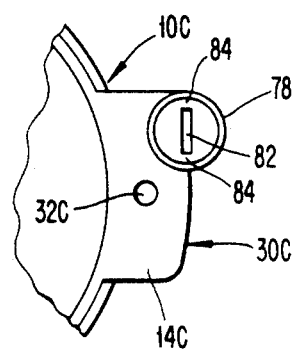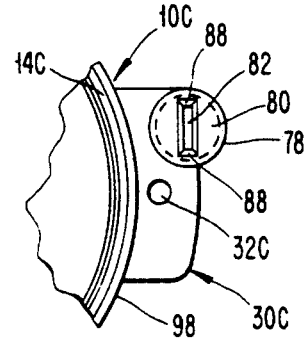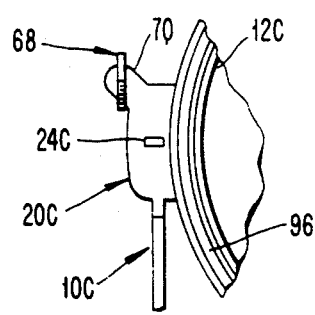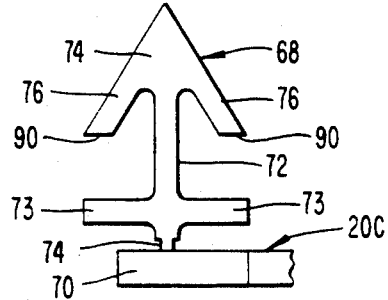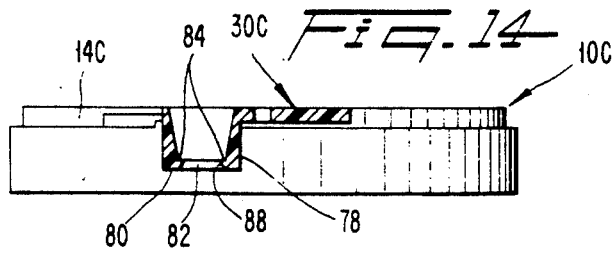

TAMPER-PROOF CONTAINER AND CAP ASSEMBLY

RELATED INVENTION

This is a continuation-in-part of U.S. application Ser. No. 07/464,417, filed Jan. 12, 1990, now U.S. Pat. No. 5,012,941.

BACKGROUND AND OBJECTS OF THE INVENTION

The present invention relates to tamper-proof container and cap assemblies, such as molded plastic vials and to a method of manufacturing same.

It is desirable in certain instances to provide a container to which access can be gained only by producing visible evidence that the container has been opened whether by accident or on purpose. Such a container would be useful in the transportation and storage of liquid specimens for example, to ensure the integrity, of the specimen. The integrity of the specimen in the vial is becoming increasingly important in the dairy industry and for drug testing. It is important to ensure the so-called "guaranteed chain of custody" of the container contents.

Various expedients have been heretofore proposed to achieve such a result. One proposal is disclosed in U.S. Pat. No. 3,556,575 in which a string seal in the form of an elongated strip possesses conical teeth and an apertured head at one end of the strip. The strip can be inserted into a member to be sealed and then a tail end of the strip is inserted through the apertured head. The strip is pulled through the head until at least one tooth, formed of an elastic material, squeezes through the aperture. That tooth cannot pass back through the aperture without being permanently destroyed and thereby provides visible evidence of tampering. Such an arrangement, however, involves certain shortcomings, including the possibility that a person could break the original strip and then substitute a replacement strip after tampering with the container contents.

Furthermore, it is necessary that a user carry a supply of such strips for use when necessary. If the strips are forgotten or mislaid, a security lapse relating to the contents becomes possible.

It is also possible that the lid of the container could become accidentally opened and contaminated while being shipped to the facility where the specimen is to be taken.

Therefore, it is desirable to provide a tamper-proof container/cap assembly which ensures a greater degree of integrity of the container contents and which eliminates the need for a user to carry a supply of string seals.

It is further desirable to provide a tamper-proof container/cap assembly which is relatively inexpensive to manufacture and easy to use.

It is also desirable to provide a container which ensures the integrity of a container prior to and subsequent to the reception of a specimen.

It is further desirable to provide a destructible connection which does not require undue effort to break.

SUMMARY OF THE INVENTION

One aspect of the present invention relates to a tamper-proof container and cap for indicating whether the container has been opened during transport to or from a specimen-receiving site. A first destructible connection is provided between the container and cap, that connection including a first destructible member which holds the cap in a closed condition whereby the cap can be opened only in response to the destruction of the first destructible member. Accordingly, an opening of the closed container during transport thereof to a specimen-receiving site is evident from a destruction of the first destructible member. One of the container and cap (preferably the container) includes a second destructible member which is adapted for one-way passage through a hole in the other of the container and cap. The second destructible member is disposed out of the hole during transport of the closed container to the specimen-receiving site and is insertable through the hole to form a second destructible connection following: (i) a destruction of the first destructible member, (ii) an insertion of a specimen into the container, and (iii) a reclosing of the cap, whereby a re-opening of the reclosed container during transport from the specimen-receiving site is evident from the destruction of the second destructible member.

Another aspect of the present invention relates to a tamper-proof container and cap for indicating whether the container has been opened. A destructible projection extends from one of the container and cap toward the other of the container and cap. The projection is planar and of arrow-like shape including a stem and a pair of converging flanges lying in a common plane. A free end of the projection is received within an elongated slot of the other of the container and cap, with the flanges projecting beyond opposite edges of the slot to prevent an opening of the cap without destroying the projection.

Preferably, the stem includes a weakened point of reduced cross-section spaced from the free end of the projection. Situated between the free end of the projection and the weakened point there is preferably provided a pair of cross pieces which make it easier to visually determine whether the stem has been broken, and to inhibit accidental dislodgement of a broken-off free end of the projection from the slot.

A further aspect of the invention relates to a cap and container wherein the container includes a channel extending circumferentially around an outer surface of the container. The channel opens toward a mouth of the container. The cap is arranged to close the mouth of the container and includes a peripheral edge arranged to be received in the channel.

A further aspect of the invention relates to a method of making a tamper-proof container and cap comprising the steps of molding one of the container and cap to include a projection having a stem and an arrow shaped free end formed by a pair of converging flanges at the free end. The other of the container and cap is molded to include an elongated slot. The cap is inserted onto the container while the container and cap are still soft, such that the flanges pass through the slot. The container and cap are caused to shrink in such manner that the flanges become disposed in overlying relationship to surfaces disposed at opposite ends of the slot in order to prevent the cap from being removed from the container without destroying the projection.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 7 is a side elevational view of still another modified vial according to the present invention with the cap thereof in a closed condition;

FIG. 8 is a longitudinal sectional view of an upper portion of the vial depicted in FIG. 7, with the cap depicted in an open condition;

FIG. 9 is an enlarged side elevational view of an upper portion of the vial depicted in FIG. 7;

FIG. 10 is a fragmentary top plan view of a portion of the cap as seen in the direction of line 10—10 in FIG. 8;

FIG. 11 is a fragmentary plan view of the cap taken in the direction of the line 11—11 in FIG. 8;

FIG. 12 is a fragmentary plan view of the container taken in the direction of the line 12—12 in FIG. 8;

FIG. 13 is an enlarged side elevational view of an arrow shaped projection which is molded in one piece with the container;

FIG. 14 is a vertical sectional view taken through a portion of the cap; and

FIG. 15 is a fragmentary longitudinal sectional view taken through the container and cap with the cap in a closed condition.

DETAILED DESCRIPTION OF PREFERRED EMBODIMENTS OF THE INVENTION

Figure 1:
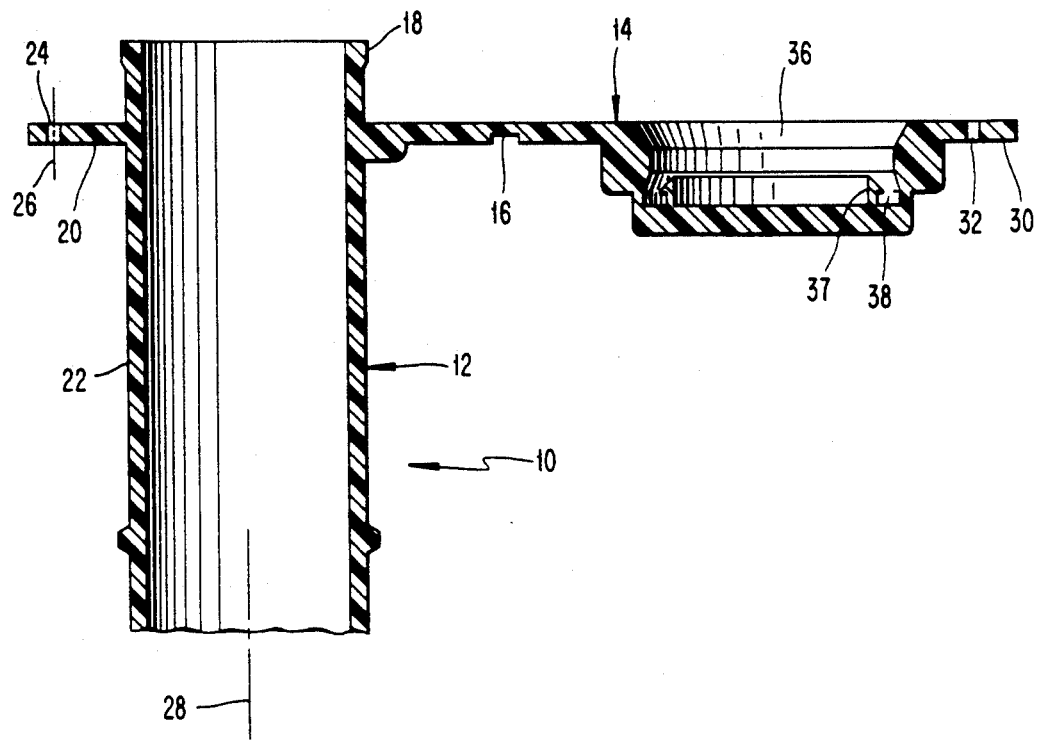
FIG. 1 is a longitudinal sectional view through a plastic vial according to the present invention.
Figure 2:
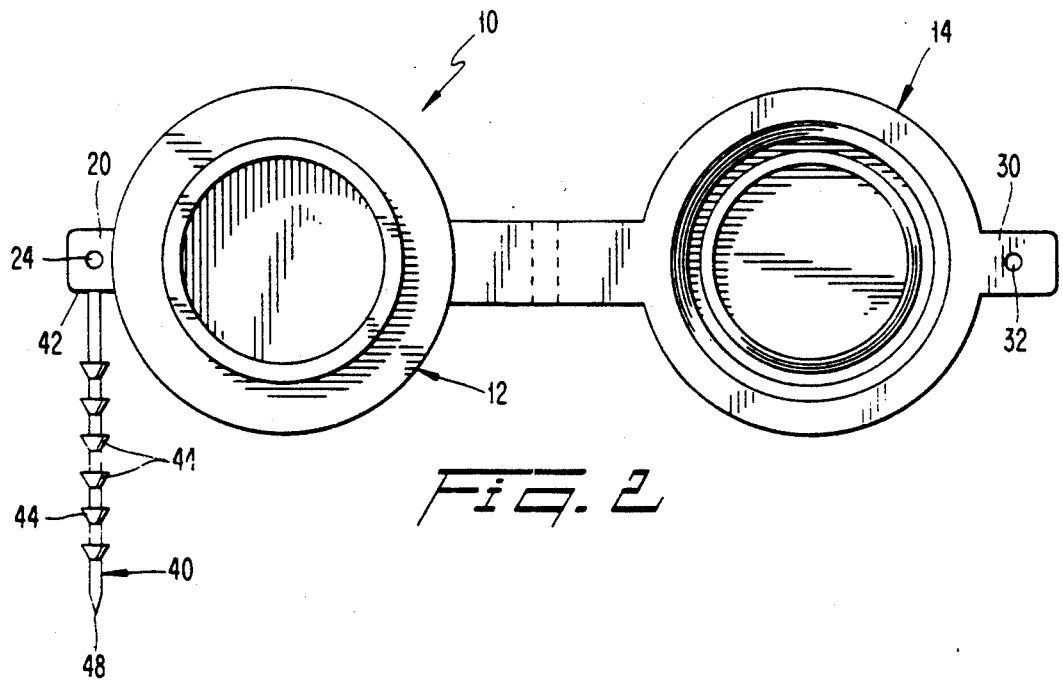
FIG. 2 is a plan view of the vial with the cap unseated from the rim of the container.

A tamper-proof plastic vial 10 comprises a container 12 and a cap 14 which are integrally molded of plastic. The cap and vial may be molded according to the process and mold disclosed in U.S. Pat. Nos. 4,783,056 and 4,812,116, respectively. With such a process and mold, the entire vial, including the cap, container, and tamper-proof seal (to be described below) can be molded in a single operation. The disclosures of those patents are incorporated by reference herein.

The cap 14 is joined to the container by an integral hinge 16 about which the cap may swing between open and closed positions. In a closed position, the cap is press-fit to a rim 18 of the container 12.

The container 12 includes an integral flange 20 projecting radially outwardly from an outer surface 22 of the container at a location adjacent the rim 18. The flange 20 possesses a through-hole 24, the axis 26 of which is disposed generally parallel to a longitudinal axis 28 of the container 12.

The cap 14 possesses a radially outwardly projecting flange 30 which includes a through-hole 32. The cap flange 30 is arranged to overlie and substantially seat upon the container flange 20 when the cap 14 is closed, whereby the through-holes 32, 24 become substantially coaxially aligned. However, slight misalignment of the through-holes will not detrimentally affect the function of the present invention. Preferably, the cap flange 30 is of such a length as to extend past the container flange 20 and thereby define a thumb tab 35 which facilitates opening of the cap 14. The cap includes a recess 36. Disposed in the recess is an annular seal member 37 forming as annular gap 38 (see FIG. 1). The gap receives the rim 18 of the container to form therewith a seal when the cap is closed.

In order to ensure that once the container has been filled with a sample or specimen the cap 14 cannot be removed without creating visual evidence of such removal, there is provided a destructible string seal in the form of a locking strip 40. The strip, which is integrally molded with an edge 42 of the container flange 20, includes a pointed shank 48 and a plurality of one-way teeth or flexible projections 42 which are configured to pass through the through-holes 32, 24 in one direction only. The teeth are preferably of conical shape and spaced along the shank 48 of the strip. Alternatively, the teeth could be of any other suitable wedge-like shape. Various embodiments of locking strips have been proposed that are suitable for use with the container of the present invention.

Figure 3:
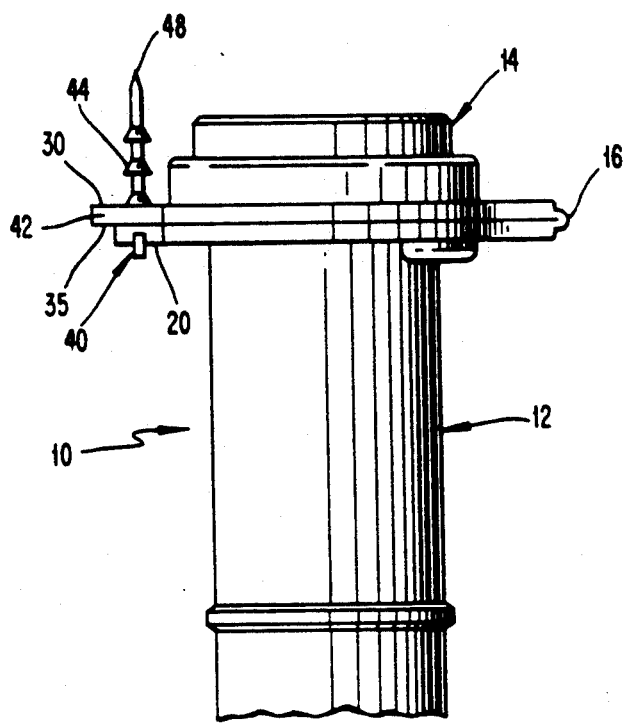
FIG. 3 is a side elevational view of the vial after the cap has been seated onto the container rim, and a locking strip has been inserted through aligned holes in a container flange and a cap flange.

The strip 40 is of sufficient flexibility and length to pass through the aligned holes 24, 32 while remaining joined to the flange 20 (see FIG. 3). Thus, once the cap 14 has been seated upon the rim of the container 12, a pointed free end 48 of the strip is inserted into either of the through-holes 24, 32 (e.g., upwardly into the through-hole 24 as depicted when the strip 40 is attached to the container flange 20), and then pulled through both through-holes, whereupon some or all of the teeth squeeze through the through-holes, due to the elastic nature of the plastic material. Once pulled through, the teeth cannot pass back through the through-holes without being permanently destroyed. Accordingly, evidence of any subsequent tampering of the container contents can be visibly detected. In order to test the sample or specimen in the container, it is necessary to cut the strip 40.

It will be appreciated that it is not possible to replace the locking strip once it has been destroyed, since the locking strip is formed integrally with the container. Hence, it is not possible to defeat the tamper-proof capabilities of the invention by replacing an original string seal with a replacement string seal as is possible in connection with prior art devices in which the string seal is separate from both the container and the cap. Furthermore, it is not necessary for a user to carry a supply of strips since the integrally molded strip will always be available with the vial 10. The integral molding of the strip with the vial can be easily and inexpensively performed.

The locking strip not only provides a tamper-proof function, but also aids in preventing dislodgement of the cap during transport, since the strip is able to clamp the flanges tightly together. Thus, additional security against spillage of the container contents is provided.

It will be appreciated that the locking strip need not be molded integrally with the container, but could instead be integrally molded with the cap. In such a case, the locking strip would preferably be inserted first through the through-hole in the cap flange and pulled downwardly through the through-hole in the container flange. This arrangement leaves the string seal strip along the body of the container and may minimize interference by the strip during transport. Furthermore, if the cap were formed separately of the container, i.e., if no integral hinge 16 is provided, there could be provided an additional set of flanges and locking strip located diametrically opposite the first set to provide securement against unauthorized removal of the cap. Moreover, other arrangements of the flanges or equivalent structure could effectively accomplish the objects of the present invention. e.g, multiple through-holes or multiple flanges. An important element is the tamper-evident securement of the locking strip to one of the container or cap.

Figure 4:
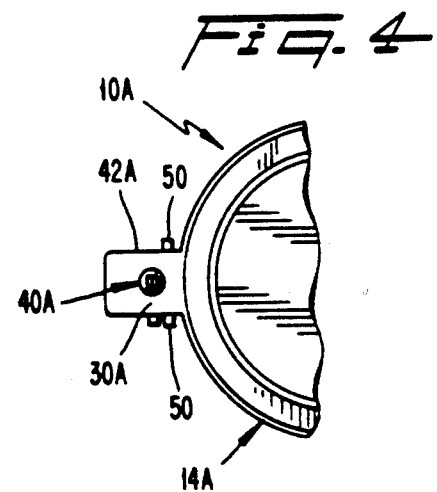
FIG. 4 is a fragmentary plan view of a modified vial according to the present invention with the cap in a closed condition.
Figure 5:
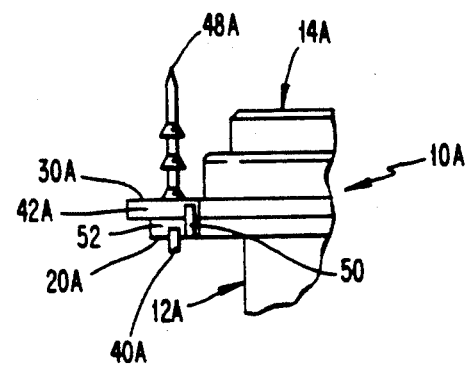
FIG. 5 is a fragmentary side elevational view of the modified container depicted in FIG. 4.

A further embodiment of the invention is depicted in FIGS. 4 and 5, wherein the reference numerals of corresponding elements of the vial are provided with a suffix "A". In this embodiment, the container flange 20A is provided with two integrally molded posts 50 which are upstanding from peripheral edges 52 of the container flange. Those posts 50 straddle the edges 42A of the cap flange 30A when the cap is inserted onto the container rim, so as to prevent relative lateral movement between the flanges in response to lateral impacts. That is, the posts oppose impacts directed laterally relative to the axis of the hole 24A which could produce relative lateral movement between the flanges. Such lateral movement could, in turn, lead to a shearing of the strip and/or an opening of the cap. In order to provide additional security as to the origin of the example or specimen in the vial, the posts 50 can be spot welded in a known manner to the cap flange 30A after the cap has been closed.

Figure 6:
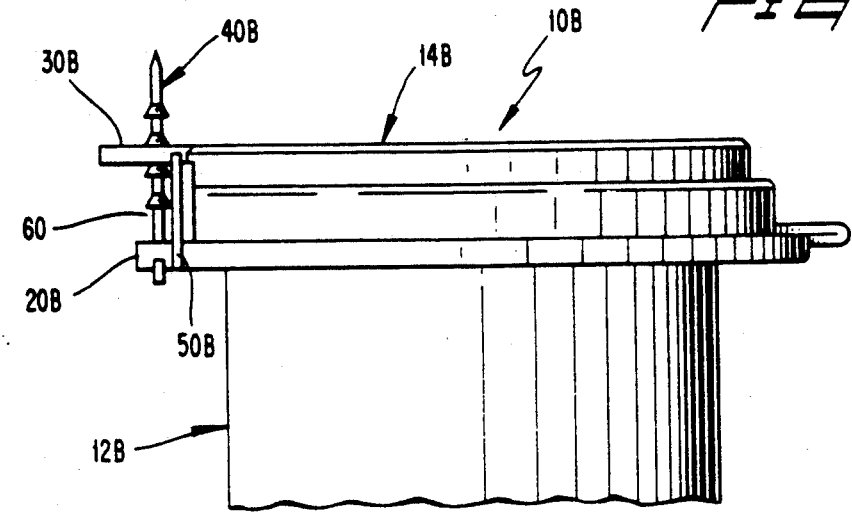
FIG. 6 is a side elevational view of an upper portion of a vial in accordance with a further modification of the invention.

An additional preferred embodiment of the invention is depicted in FIG. 6, wherein the reference numerals of corresponding elements of the vial are provided with a suffix "B". In this embodiment, the cap flange 30B is positioned adjacent the top cf the cap generally in the plane of the upper surfaces of the cap 14B, whereby a space 60 is formed between the cap flange 30B and the container flange 20B after the cap 14B has been inserted onto the container rim. The presence of such a space provides more convenient access to the strip 40B in order to cut the strip when the vial is to be opened. In such an embodiment, the presence of posts 50B is particularly advantageous in order to resist inadvertent opening of the cap in response to the application of lateral impact to the cap flange 30B.

Another embodiment of the invention is depicted in connection with FIGS. 7–15 which relates to a container 10C whose integrity is ensured during transport to and from a specimen-receiving site. Elements of the container and cap similar to those of the embodiment disclosed in connection with FIG. 6 are given similar reference numerals with the suffix C.

The container flange 20C of the container 10C carries a flexible one-way strip 40C as well as a breakable pointed projection 68 which extends from a protrusion 70 of the container flange 20C (see FIGS. 12, 13). The projection 68 comprises a stem 72 having an arrow-shaped free end 74 which is molded in one piece with the stem 72, container flange 20C, strip 40C, container 12C, and cap 14C. The arrow-shaped end 74 includes a pair of flanges 76 which converge to a point in a direction away from the container flange 20C.

The projection is of generally planar configuration in that the stem 72 and flanges 76 lie in a common plane. Integrally molded of one piece with the stem are two cross pieces 73 which are mutually aligned and extend laterally from the stem. The cross pieces 73 also lie in the common plane with the stem 72 and flanges 76. The cross pieces 73 facilitate easier detection of tampering.

The stem includes a weakened point 74 of reduced cross section located at the juncture of the stem 72 and container flange 20C. As will become apparent, when sufficient tension is applied to the projection, the stem will break at the weakened point 74.

The cap flange 30C includes a hollow element in the form of a cylinder 78 which is arranged to be coaxial relative to the stem 72 when the cap is closed. The cylinder 78 includes a floor 80 (see FIG. 14) in which a diametrically elongated slot 82 is formed. The ends of the slot terminate short of the cylinder, whereby the floor forms a pair of shoulder surfaces 84 adjacent opposite ends of the slot. The slot is of such a length that the arrow-like free end 74 can be passed therethrough while still at a slightly elevated temperature, i.e., not fully cured or in a somewhat soft state, following the molding step. That is, following the molding of the one-piece container-and-cap assembly, the cap is closed onto the mouth or rim 18C of the container while the cap and container are not in a fully-cured or fully-set state. In that way, the seating of the cap on the container is self-adjusting to ensure a proper fit.

Also, the projection 68 and slot 82 are sized so that when the container-and-rap assembly is still soft, the flanges 76 are able to pass freely through the slot. At that time, the projection is uncured and possesses no appreciable elasticity. The sizes of the projection 68 and floor 80 are designed so that during the subsequent cooling and curing (which produces shrinkage), the amounts of shrinkage of the projection 68 and floor 80 are controlled whereby at the end of the cooling/-shrinking stage the shoulder surfaces 84 of the floor underlie the free ends 90 of the flanges 76. This can be accomplished, for example, by making the floor 80 thicker than the projection 68, whereby the floor undergoes a greater amount of shrinkage than the projection. As a result, the cap 14C cannot be opened without breaking the projection 68.

It will be appreciated that by initially inserting the projection through the slot when the container-and-cap unit is soft, there is no need to dimension the stem to be strong enough to withstand compressive loads which would occur if the projection were forced through the slot in a fully cured and shrunken state requiring that the flanges be cammed inwardly to clear the slot. A stem strong enough to resist buckling under such compressive loading would also require the application of an unduly large tensile force in order to be broken when the rap is being opened. In other words, by inserting the projection through the slot in an essentially resistance-free manner, the strength of the stem can be designed solely with regard to tensile-resistance considerations.

By closing the cap 14C at the end of the manufacturing process, it is ensured that as long as the projection 68 remains intact, the container will not have become accidentally opened and contaminated during transport and handling. Also, since the arrow-shaped free end 74 of the projection is located within the cylinder 80, the flanges 76 will be shielded during transport. The cap includes a recess 36C in which is disposed an annular seal member 37C. The latter forms a downwardly open gap to receive the rim 18C of the container in order to form a seal therewith.

Extending circumferentially around an outer surface of the container 12C is a channel 96 (see FIGS. 8, 15) which opens toward the mouth 18C of the container.

The cap 14C includes a peripheral edge 98 which extends beyond the plane of the hinge 16 and is configured to be received in the channel when the cap is closed. In that way, a tortuous bacterial path is established which resists the entry of bacteria into the container. Also, the peripheral edge of the cap will not be exposed and thus cannot be subjected to forces which could cause the cap to accidentally open. Rather, the cap can only be opened by the application of forces to the flange 30C. Hence, the risk of the container being accidentally opened during transport and handling is yet further reduced.

From the foregoing, it will be appreciated that the container 12C is molded in one-piece with the cap 14C, preferably of a suitable thermoplastic material. The assembly is removed from the mold in the condition depicted in FIG. 8. While the assembly is still in a somewhat soft state condition, the cap is inserted onto the container as noted earlier. That softened state enables the seating surfaces of the container and cap to properly conform to one another, but is not so soft as to enable the cap to bond to the container.

Simultaneously with the closing of the cap, the arrow shaped free end 74 of the projection 68 passes freely through the slot 82 in the cap. Thereafter, during the remainder of the cooling/shrinking phase, the shoulder surfaces 84 become located beneath the ends 90 of the flanges 76 to establish a first destructible connection between the cap and container.

Also during the closing of the cap, the peripheral edge 98 of the cap enters the channel 96 of the container, thereby creating a tortuous path for the entry of bacteria into the container, and also minimizing the tendency for the cap to be accidentally opened.

The assembly 12C, 14C can now be shipped to a specimen-receiving site where the projection 87 is visibly inspected to ensure that it is still intact. Breakage of the projection will likely have occurred at its weakest point, i.e., the point of reduced cross-section 74. The breakage thereof will be evident by the ability of the projection to move freely. Although the stem is thin and difficult to see, the presence of the cross pieces 73 will render movement of the projection easier to notice.

Also, when the cap is thereafter opened, the cross pieces 73 prevent the projection from passing through the slot and dropping out of the cylinder 78. Thus, the tendency for the specimen-receiving site to become littered with pieces of plastic is prevented.

If the visual inspection reveals the projection 68 to be intact, then it can be concluded that the container has not been accidentally opened and contaminated. The projection can now be broken by pushing upon the flange 30C, causing the stem to break at point 74.

Thereafter, a specimen can be introduced into the container and the cap reclosed. The flat, flexible one-way strip 40C is then be inserted through the holes 24C, 32C to establish a second destructible connection for the vial, whereby an opening of the cap during shipment will be made evident by the breakage of the strip.

It will be appreciated that if it is only necessary that the integrity of the container be maintained during initial shipment, then the container and cap assembly can be manufactured without the strip 40C.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A tamper-proof container and cap for indicating whether the container has been opened, comprising:
   a destructible projection extending from one toward the other of said container and cap, said projection including a stem integrally molded with said one of said container and cap and at least one laterally extending flange at a free end of said stem, said stem including a single weakened point of reduced cross section disposed at an end of said stem opposite said free end thereof, a cross piece projecting laterally from said stem at a location intermediate said free end and said weakened point, said cross piece being coplanar with said stem and said flange,
   an elongated slot formed in the other of said container and cap and receiving said free end of said projection, said flange extending laterally beyond an edge of said slot such that said cap can be opened only in response to breakage of said projection at said weakened point, said slot being situated between said flange and cross piece to prevent separation of said projection from said other of said container and cap after said projection has been broken,
   said container including a channel extending circumferentially around an outer surface thereof, said channel being open toward said cap, said channel receiving a peripheral edge of said cap when said cap is closed.

2. A tamper-proof container according to claim 1, wherein said stem projects from said container, and said slot is formed in said cap.

3. A tamper-proof container according to claim 2, wherein said other of said container and cap includes a hollow element, said slot being formed in a floor of said hollow element such that said flange is situated within said element.

4. A temper-proof container according to claim 1, wherein said cap includes a recess to receive a rim of said container, and an annular seal member disposed within said recess above said peripheral edge of said cap, said annular seal member forming a downwardly open gap within which said rim is received to form a seal.

5. A tamper-proof container according to claim 1, wherein said cap is molded of one-piece with said container, said cap and container being molded of plastic.

6. A tamper-proof container according to claim 1, wherein there are two of said flanges arranged to converge in a direction away from said weakened point, and there are two of said cross pieces arranged in alignment with one another.

7. A tamper-proof container according to claim 1, wherein one of said container and cap includes a second destructible member adapted for one-way passage through a hole in the other of said container and cap.

8. A tamper-proof container according to claim 1, wherein said container has a closed bottom.

9. A tamper-proof container and cap for indicating whether the container has been opened, comprising:
   a destructible connection between said container and cap including a destructible member holding said cap in a closed condition such that said cap can be opened only in response to destruction of said destructible member, said container including an annular rim forming a mouth of said container, and an upwardly open annular channel extending circumferentially around an outer surface of said container at a location below said rim, said cap including:
- a recess for receiving said rim to close said mouth,
- a peripheral edge received in said channel when said cap is closed, and
- an annular seal member disposed within said recess at a location above said peripheral edge, said annular seal member forming a downwardly open gap in which said rim is received to form a seal.

10. A cap and container according to claim 9, wherein said cap is molded of one-piece with said container, said cap and container being formed of plastic.

11. A tamper-proof container and cap for indicating whether the container has been opened, comprising:
- a destructible projection extending from one toward the other of said container and cap, said projection including a stem integrally molded with said one of said container and cap and at least one laterally extending flange at a free end of said stem, said stem including a single weakened point of reduced cross section disposed at an end of said stem opposite said free end thereof, a cross piece projecting laterally from said stem at a location intermediate said free end and said weakened point, said cross piece being coplanar with said stem and said flange,
- an elongated slot formed in the other of said container and cap and receiving said free end of said projection, said flange extending laterally beyond an edge of said slot such that said cap can be opened only in response to breakage of said projection at said weakened point, said slot being situated between said flange and cross piece to prevent separation of said projection from said other of said container and cap after said projection has been broken,
- said cap being molded of one-piece with said container, and said cap and container being molded of plastic.

12. A tamper-proof container according to claim 11, wherein said container has a closed bottom.

13. A tamper-proof container and cap for indicating whether the container has been opened, comprising:
- a destructible projection extending from one toward the other of said container and cap, said projection including a stem integrally molded with said one of said container and cap and at least one laterally extending flange at a free end of said stem, said stem including a single weakened point of reduced cross section disposed at an end of said stem opposite said free end thereof, a cross piece projecting laterally from said stem at a location intermediate said free end and said weakened point, said cross piece being coplanar with said stem and said flange,
- an elongated slot formed in the other of said container and cap and receiving said free end of said projection, said flange extending laterally beyond an edge of said slot such that said cap can be opened only in response to breakage of said projection at said weakened point, said slot being situated between said flange and cross piece to prevent separation of said projection from said other of said container and cap after said projection has been broken,
- said container and cap including a second destructible member adapted for one-way passage through a hole in another of said container and cap.

14. A tamper-proof container according to claim 13, wherein said container has a closed bottom.

* * * * *